US008455800B2

(12) United States Patent
Tix et al.

(10) Patent No.: US 8,455,800 B2
(45) Date of Patent: Jun. 4, 2013

(54) HELIX HEATED HOSE

(75) Inventors: Joseph E. Tix, Hastings, MN (US); Mark T. Weinberger, Mounds View, MN (US); Douglas S. Ryder, St. Michael, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 217 days.

(21) Appl. No.: 12/675,250

(22) PCT Filed: Sep. 11, 2008

(86) PCT No.: PCT/US2008/075960
§ 371 (c)(1),
(2), (4) Date: Feb. 25, 2010

(87) PCT Pub. No.: WO2009/036127
PCT Pub. Date: Mar. 19, 2009

(65) Prior Publication Data
US 2010/0237061 A1   Sep. 23, 2010

Related U.S. Application Data

(60) Provisional application No. 60/971,346, filed on Sep. 11, 2007.

(51) Int. Cl.
*H05B 3/58*       (2006.01)
*F16L 3/00*       (2006.01)

(52) U.S. Cl.
USPC .......... 219/535; 219/536; 219/537; 219/539; 219/544; 219/545; 138/106; 138/129; 138/33

(58) Field of Classification Search
USPC .......... 219/535, 536–7, 539, 544–5; 138/106, 138/129, 33
See application file for complete search history.

(56) References Cited

U.S. PATENT DOCUMENTS

| | | |
|---|---|---|
| 2,758,194 A | 8/1956 | Heron |
| 2,801,323 A | 7/1957 | Heron |
| 3,439,700 A | 4/1969 | Preston |
| 3,661,170 A | 5/1972 | Mitchell |
| 3,770,022 A | 11/1973 | Beisemann |
| 4,352,007 A | 9/1982 | Baker et al. |
| 4,582,281 A | 4/1986 | Van Camp |
| 5,395,054 A | 3/1995 | Wheeler |
| 5,687,937 A | 11/1997 | Habib |
| 6,834,900 B2 | 12/2004 | Wright |
| 7,258,140 B2 | 8/2007 | Acree |
| 2007/0023090 A1* | 2/2007 | Foster .......... 137/597 |
| 2008/0151046 A1* | 6/2008 | Scott et al. .......... 348/82 |

* cited by examiner

*Primary Examiner* — Shawntina Fuqua
(74) *Attorney, Agent, or Firm* — Douglas B. Farrow

(57) ABSTRACT

The helix heated hoses 10 and 12 use two features to increase the flexibility. The first feature is a braided-copper heating element 14, which has increased flexibility over the prior art solid copper heating element. The element is spiral wound around the hose and held in place with a moisture barrier 16. The second feature is the helix twist 18 located just before the point where the hoses 10 and 12 attach to the manifold 20. The helix feature is created with the helix support 22, which initiates the twist around 24 inches back from the point of termination. The helix feature works to reduce the moment of inertia about the neutral axis 26 of the two supply hoses 10 and 12.

4 Claims, 2 Drawing Sheets

HELIX HEATED HOSE

TECHNICAL FIELD

This application claims the benefit of U.S. Application Ser. No. 60/971,346, filed Sep. 11, 2007, the contents of which are hereby incorporated by reference.

BACKGROUND ART

Heated hoses are required for use in spraying of various materials such as fast set foams. Such hoses tend to be relatively inflexible and hard for the operator to manage.

DISCLOSURE OF THE INVENTION

The helix heated hoses use two features to increase the flexibility. The first feature is a braided-copper heating element, which has increased flexibility over the previous solid copper heating element. The element is spiral wound around the hose and held in place with a moisture barrier. The second feature is the helix twist located just before the point where the hoses attach to the manifold. The helix feature is created with the helix support, which initiates the twist around 24 inches back from the point of termination. The helix feature works to reduce the moment of inertia about the neutral axis of the two supply hoses. For a traditional heated hoses to flex, one supply hose must compress while the other side is in tension. By making the hoses cross and slide past each other during flexing, the only rigidity felt during flexing is from the stiffness in the hose themselves.

The advantages in the helix heated whip hose is that the force required to pivot the gun from left to right is decreased from 20 to 5 lbs of force. This decrease in force will benefit the spray applicator from arm and wrist fatigue. Test results showed up to a 400% increase in flexibility over a similarly constructed hose without the helix feature These and other objects and advantages of the invention will appear more fully from the following description made in conjunction with the accompanying drawings wherein like reference characters refer to the same or similar parts throughout the several views.

BEST MODE FOR CARRYING OUT THE INVENTION

Figure 1:
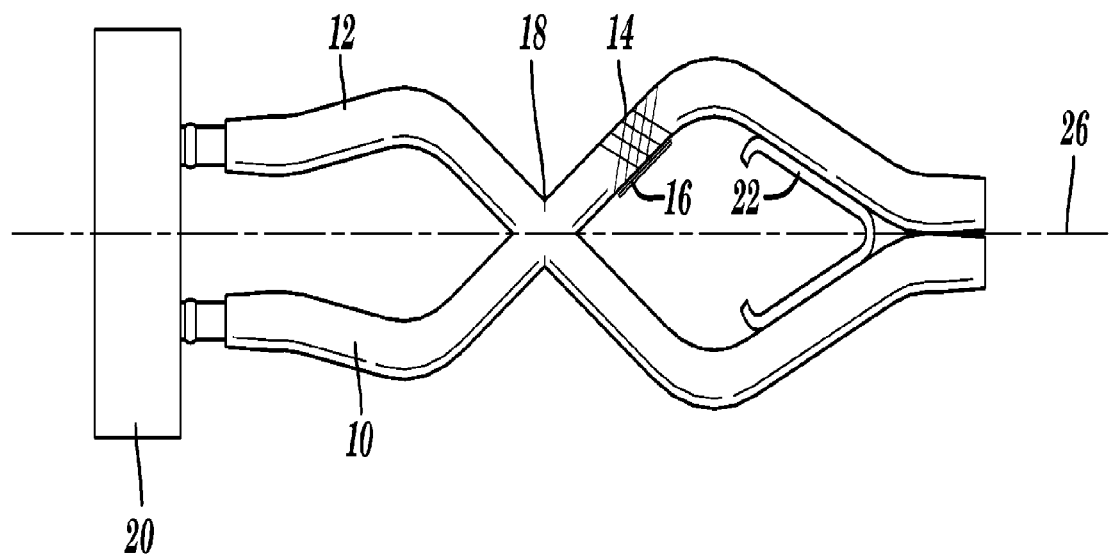
FIG. 1 shows a helix heated hose of the instant invention.
Figure 2:
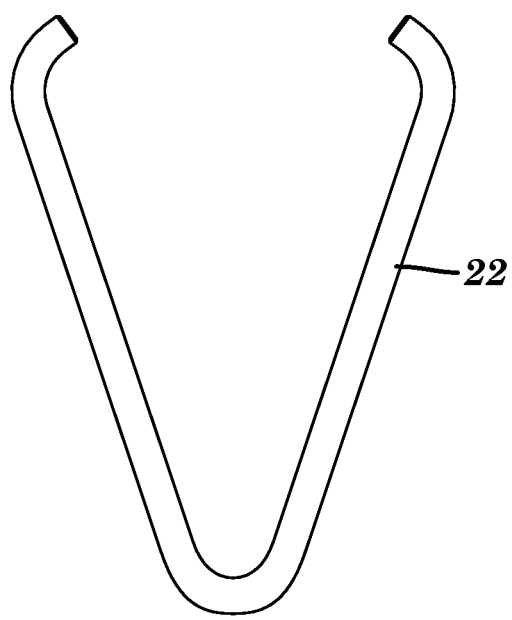
FIG. 2 shows the helix support.

The first and second helix heated hoses 10 and 12 use two features to increase the flexibility. The first feature is a braided-copper heating element 14, which has increased flexibility over the prior art solid copper heating element. The element is spiral wound around the hose and held in place with a moisture barrier 16. The second feature is the helix twist 18 located just before the point where the hoses 10 and 12 attach to the manifold 20. The helix feature is created with the helix support 22, which initiates the twist around 24 inches back from the point of termination. The helix feature works to reduce the moment of inertia about the neutral axis 26 of the two supply hoses 10 and 12. For traditional heated hoses to flex, one supply hose must compress while the other side is in tension. By making the hoses cross and slide past each other during flexing, the only rigidity felt during flexing is from the stiffness in the hose themselves.

The advantages in the helix heated whip hose is that the force required to pivot the gun from left to right is decreased from 20 to 5 lbs of force. This decrease in force will benefit the spray applicator from arm and wrist fatigue. Test results showed up to a 400% increase in flexibility over a similarly constructed hose without the helix feature It is contemplated that various changes and modifications may be made to the heated hose without departing from the spirit and scope of the invention as defined by the following claims.

The invention claimed is:

1. A heated hose assembly for use with plural component materials, said hose assembly being designed for attachment to a hose manifold and an applicator, said hose assembly comprising:
    a first hose having a heating element and being attached to said hose manifold; and
    a second hose having a heating element and being attached to said hose manifold, at least a portion of said first and second hoses being helically wound relative to each other to enhance flexibility.

2. The heated hose assembly of claim 1 further comprising a helix support located between said hoses to position said first and second hoses relative to one another.

3. The heated hose assembly of claim 2 wherein said helix support is V-shaped.

4. The heated hose assembly of claim 1 wherein each said hose comprises a braided-copper heating element.

* * * * *